United States Patent
Rice et al.

(10) Patent No.: US 9,085,021 B1
(45) Date of Patent: Jul. 21, 2015

(54) DEVICES AND METHODS FOR TRAPPING NON-AQUEOUS-PHASE LIQUIDS AND VENTING GAS FROM SUBAQUEOUS SEDIMENT

(71) Applicant: TRC ENVIRONMENTAL CORPORATION, North Windsor, CT (US)

(72) Inventors: John Rice, Fitchburg, WI (US); Thomas R. Stolzenburg, Madison, WI (US)

(73) Assignee: TRC Environmental Corporation, North Windsor, CT (US)

( * ) Notice: Subject to any disclaimer, the term of this patent is extended or adjusted under 35 U.S.C. 154(b) by 0 days.

(21) Appl. No.: 13/838,930

(22) Filed: Mar. 15, 2013

(51) Int. Cl.
*B09C 1/00* (2006.01)
(52) U.S. Cl.
CPC ....................................... *B09C 1/002* (2013.01)
(58) Field of Classification Search
CPC ........................................................ B09C 1/002
USPC ...................................... 405/129.55, 12, 9.57
See application file for complete search history.

(56) References Cited

U.S. PATENT DOCUMENTS

| | | | | |
|---|---|---|---|---|
| 4,344,722 | A | * | 8/1982 | Blais ......................... 405/129.75 |
| 4,577,996 | A | * | 3/1986 | Elias et al. ..................... 405/270 |
| 4,842,448 | A | * | 6/1989 | Koerner et al. .......... 405/128.35 |
| 5,080,528 | A | | 1/1992 | Ressi di Cervio |
| 5,401,552 | A | * | 3/1995 | Bohrer et al. ................. 405/270 |
| 5,584,605 | A | | 12/1996 | Beard |
| 5,601,906 | A | * | 2/1997 | Henry ....................... 405/129.45 |
| 6,386,796 | B1 | | 5/2002 | Hull |
| 6,558,081 | B2 | | 5/2003 | Hull |
| 8,419,314 | B1 | | 4/2013 | McLinn |
| 2002/0151241 | A1 | * | 10/2002 | Sheahan et al. ................ 442/327 |
| 2009/0110486 | A1 | | 4/2009 | McLinn |

FOREIGN PATENT DOCUMENTS

WO 2005058516 6/2005

OTHER PUBLICATIONS

Mutch, R. et al., "Monitoring the uplift of a low-permeability sediment cap due to gas entrapment beneath the cap: findings of the first 18 months", 2005, The Annual International Conference on Soils, Sediment, Water, and Energy, University of Massachusetts, Amherst, Massachusetts.
Boles et al., Temporal Variation in Natural Methane Seep Rate Due to Tides, Coal Oil Point Area, California, J. Geophys. Res. 106:27077-27086, 2001.
McAnulty et al., NAPL Migration from Contaminated Sediment 2: Implications for Remedial Design, Presented at the Fourth International Conference on Remediation of Contaminated Sediments, Savannah, Georgia, 2007.
McLinn et al., From DNAPL to LNAPL—Methanogeneisis Facilitates MGP Tar Migration from Contaminated Sediment in a Tidal River, Proceedings of the Fourth International Conference on Remediation of Chlorinated and Recalcitrant Compounds, Monteray, California, 2004.

(Continued)

*Primary Examiner* — John Kreck
(74) *Attorney, Agent, or Firm* — Quarles & Brady LLP

(57) ABSTRACT

Devices and methods for preventing migration of buoyant contaminants from subaqueous contaminated sediment while providing for venting of gas that migrates from the contaminated sediment are described.

40 Claims, 2 Drawing Sheets

(56) References Cited

OTHER PUBLICATIONS

McLinn et al., NAPL Migration from Contaminated Sediment 1: Diagnosis and Transport Mechanisms, Presented at the Fourth International Conference on Remediation of Contaminated Sediments, Savannah, Georgia, 2007.

Zhao et al., Combined Active Capping/Wetland Demonstration in the Chicago River, Proceedings of the Fourth International Conference on Remediation of Contaminated Sediments, Savannah, Georgia, 2007.

* cited by examiner

DEVICES AND METHODS FOR TRAPPING NON-AQUEOUS-PHASE LIQUIDS AND VENTING GAS FROM SUBAQUEOUS SEDIMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to devices and methods for trapping and sequestering non-aqueous-phase liquids (NAPLs) from subaqueous sediment. NAPLs are hydrophobic liquids having low solubility and a low surface tension. Consequently they have a low water solubility and form a separate phase liquid when placed in water. NAPLs can be lighter-than-water (LNAPL) or denser-than-water (DNAPL). NAPLs are often found at or near industrial sites or former industrial sites. For example, historic wastewater outfalls from manufactured gas plants (MGP) sites often contain NAPL-contaminated sediment from the discharge of coal tar. Likewise, current or historical discharges from other industrial sites, such as refineries, wood-treating facilities, asphalt plants, coking plants, steel mills, and others may contain NAPL (either or both LNAPLs and DNAPLs).

Buoyant gases (e.g. carbon dioxide, methane) produced upon degradation of organic matter present in underwater sediment can migrate as buoyant bubbles via ebullition to the surface of a body of water. When the underwater sediment contains a NAPL, the NAPL can be entrained with the bubbles and carried upward through the sediment and through the overlying water column to the water surface. After the bubble breaks at the water surface, the entrained NAPL can form at the water surface a sheen that can pose a health hazard to human and ecological receptors (e.g., coal tar and gasoline contain known human carcinogens). LNAPL, being lighter than water, can itself rise through the water without being entrained with the buoyant gas bubbles toward the surface where it too can form a surface sheen.

NAPL migration has been addressed by dredging, in-filling, in-situ stabilization, and capping. Published US Patent Application 20090110486, incorporated herein by reference in its entirety as if set forth herein, describes NAPL trapping cap devices and methods for use. The art is still in need of additional devices and methods for controlling or preventing NAPL migration from NAPL-contaminated sediments upward toward the surface, particularly where it is difficult to direct LNAPL or DNAPL to an accumulation zone or to vent gases present in the contaminated sediment at the accumulation zone. Such conditions can exist when the contaminated subsurface sediment is located far from shore or over uneven underwater surfaces.

SUMMARY OF THE INVENTION

While the invention is described principally in terms of controlling NAPLs, it is equally applicable to other contaminants in a body of water that can rise from a contaminated soft subsurface sediment site to the water surface, either by virtue of being less dense than the water or by being entrained with gases released from the subsurface contamination site. The term "buoyant contaminant" is intended to embrace LNAPLs, DNAPLs, and other migrating contaminants without limitation.

In a first aspect, a method for directing a NAPL from a NAPL-contaminated, subaqueous sediment into an accumulation layer includes the step of interposing in the upward path of the NAPL between the sediment and the surface a device comprising a barrier layer, an armoring layer above the barrier layer, a bedding layer between the armoring layer and the barrier layer, and an accumulation layer below the barrier layer. The barrier layer has a pore entry pressure sufficiently high that a gas layer of desired height accumulates beneath the barrier layer in the accumulation layer. The gas layer height, measured in inches of gas and representing the displacement of water from the accumulation layer, is determined by an ascertainable attribute of the composition of the barrier layer material, namely its pore entry pressure, which can also be referred to as the air entry pressure.

The gas layer has an upper boundary in contact with the barrier layer and a lower boundary in contact with subsurface water in the accumulation layer. The gas in the gas layer comprises the buoyant gases that migrate via ebullition after organic decomposition in the sediment. Once the gas layer develops to the height dictated by the barrier layer pore entry pressure, gas vents through the barrier layer and to the surface, but beneath the barrier layer the gas layer is maintained. The height is adjustable by design and is increased by providing a barrier layer having higher pore entry pressure or decreased by providing a barrier layer having lower pore entry pressure.

At the interface (phreatic surface or water table) between the lower boundary of the gas layer and the water below, buoyant contaminants accumulate in the water at an accumulation zone in the accumulation layer. In some embodiments, the method may also include a step of treating, detoxifying, or immobilizing, or removing the accumulated contaminants using any suitable technique known to an ordinarily skilled artisan, for example including, but not limited to, physical removal or oxidation, or volatilization.

In a second aspect, the invention is summarized as a device which, in use, is provided in a body of water above a contaminated, subaqueous sediment site.

These and other features, aspects and advantages of the present invention will become better understood from the description that follows. In the description, reference is made to the accompanying drawings, which form a part hereof and in which there is shown by way of illustration, not limitation, embodiments of the invention. The description of preferred embodiments is not intended to limit the invention to cover all modifications, equivalents and alternatives. Reference should therefore be made to the claims recited herein for interpreting the scope of the invention.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings, wherein.

Figure 1:
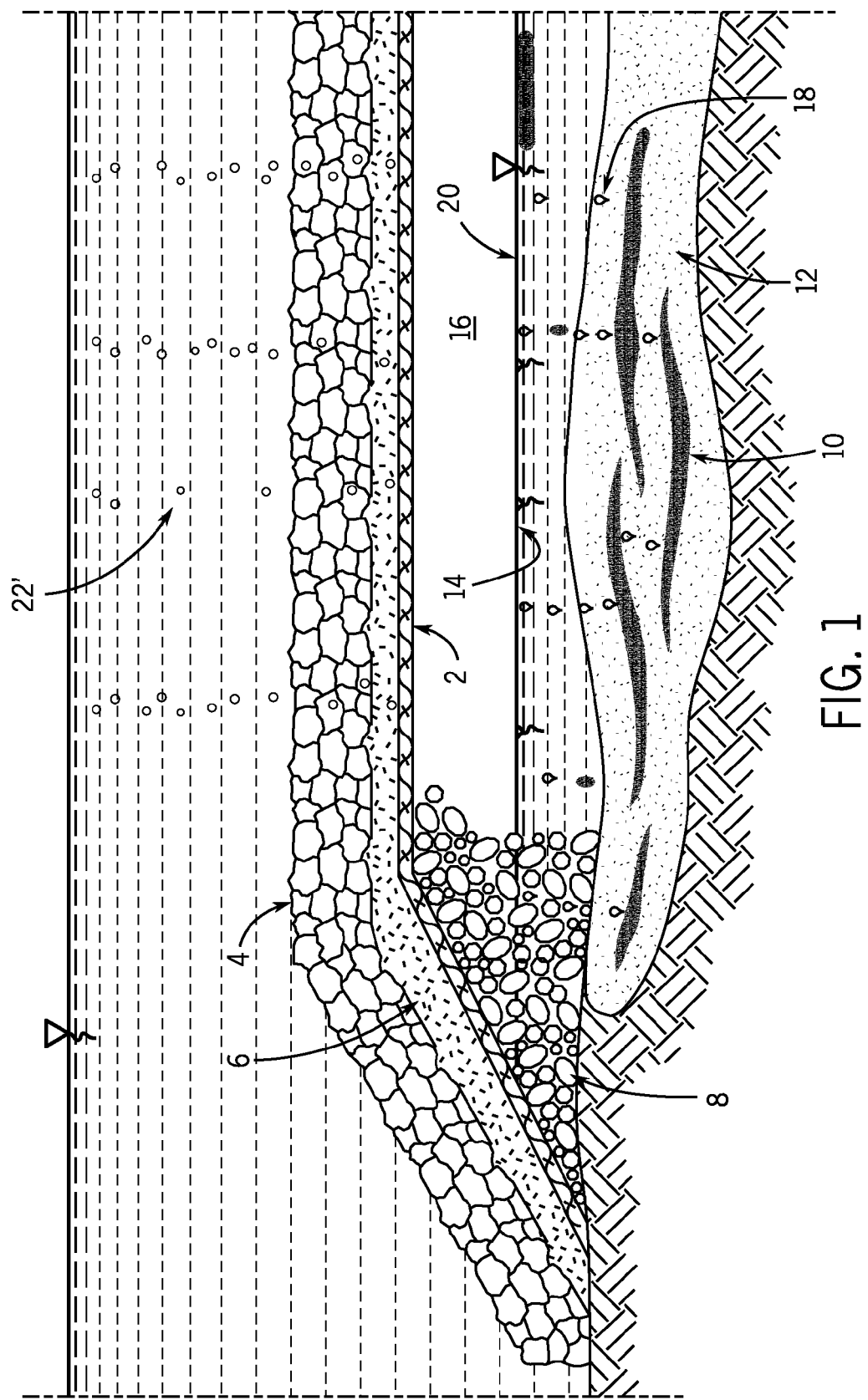
FIG. 1 is a side sectional view of an internal trapping, internally venting cap design suited for installation at contamination sites having a substantially flat topography.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF PREFERRED EMBODIMENTS

The present invention relates to the inventors' observation that buoyant contaminants can migrate through subaqueous sediment [independently where the contaminants are lighter (less dense) than water or via ebullition where the contaminants are either lighter (less dense) or heavier (denser) than water]. NAPLs can cause a sheen at the water surface. Where the contaminated sediment is near a shoreline or otherwise readily accessible, one can construct a cap that directs the contaminants along with gas that co-migrates with the contaminants to an accumulation zone for removal or treatment. The co-migrating gases can be readily vented. On the other hand, the inventors here provide a device, and methods employing the device, suited for use where it is impractical to provide an accessible accumulation zone and vent, but where it is still desirable to sequester the migrating contaminants and to vent gas from beneath the device without permitting the contaminants to migrate through or around the cap.

The devices shown in FIGS. 1 and 2 may be manufactured substantially as described below.

In accord with the invention, a device that provides an internal trap and internal vent as shown in FIG. 1 can be constructed over a contaminated site. The device comprises a barrier layer 2, an armoring layer 4 above the barrier layer 2, a bedding layer 6 between the armoring layer 4 and the barrier layer 2, and an accumulation layer 8 below the barrier layer 2. The device directs one or more buoyant contaminants 10 from a contaminated, subaqueous sediment 12 into an accumulation zone 14 of the accumulation layer 8. The barrier layer 2 has a pore entry pressure sufficiently high that, in use, a gas layer of desired height accumulates beneath the barrier layer 16 in the accumulation layer 8, as described above. The barrier layer 2 can comprise a commercially available geotextile, a fine-grained geologic material, or a combination thereof, and is typically provided as a substantially horizontal layer that is parallel with the water surface. The skilled artisan can select an appropriate barrier layer material, taking into account the location and contours of the installation site and the desired geometry of the device. The accumulation layer 8 is gas-permeable and is constructed from a granular material, such as sand or gravel. The accumulation layer 8 may additionally contain amendments (e.g., carbon, coke or organoclay). The bedding layer 6 can comprise, e.g., crushed stone. The armoring layer 4 should comprise a material having enough mass that it will not be moved by the highest anticipated erosive forces or the highest buoyant forces of the accumulated gas beneath the barrier layer. The armoring layer 4 can be a granular material (e.g., gravel, riprap or boulders), a composite of granular material and a geotextile. Alternatively, the armoring layer 4 can be articulated block mats (Nilex Geosynthetics; Denver, Colo.) or interlocking concrete blocks (e.g., Xbloc® from Delta Marine Consultants b.v.; Gouda, The Netherlands). The bedding layer 6 and armoring layer 4 can be considered optional components of the device that can be included when desired for purposes convenient device construction and added device stability. Note that, for clarity, the material of the accumulation layer is depicted only in a portion of the layer, although it would be present throughout. Only one end portion of the device is shown; a comparable second end could be present or the device could be combined with a different trapping cap device, as warranted by a particular site. Lighter-than-water contaminants can migrate toward the surface, whereas heavier-than water contaminants are carried via ebullition on the exterior of gas bubbles 18 rising through the contaminated sediment. Both types of migrating contaminants are considered buoyant for purposes of this invention. FIG. 1 depicts a site containing heavier-than-water DNAPL, but the device would treat lighter than water contaminants comparably. In FIG. 1, some of the gas bubbles rising from the sediment entrain DNAPL contaminants which rise with the gas bubbles through the accumulation layer to the water table 20 beneath the device. At the gas-water interface of the water table, the gas bubbles burst into the gas layer beneath the barrier layer, leaving the DNAPL trapped at the interface. As the gas layer reaches the pore entry pressure of the barrier layer, gas 22 is vented through the barrier layer into the water above the device and then to the air above the water, while the migrated contaminant is sequestered or treated in the accumulation layer. Although not shown in FIG. 1, it will be understood that LNAPL and other lighter-than-water buoyant contaminants will migrate to the water table and will likewise be trapped in the accumulation zone at the gas-water interface. If the sediment surface of the site is sloped, one can construct the device using a series of adjacent steps to provide substantially horizontal vent portions that each maintain an appropriate distance from the sediment surface.

Figure 2:
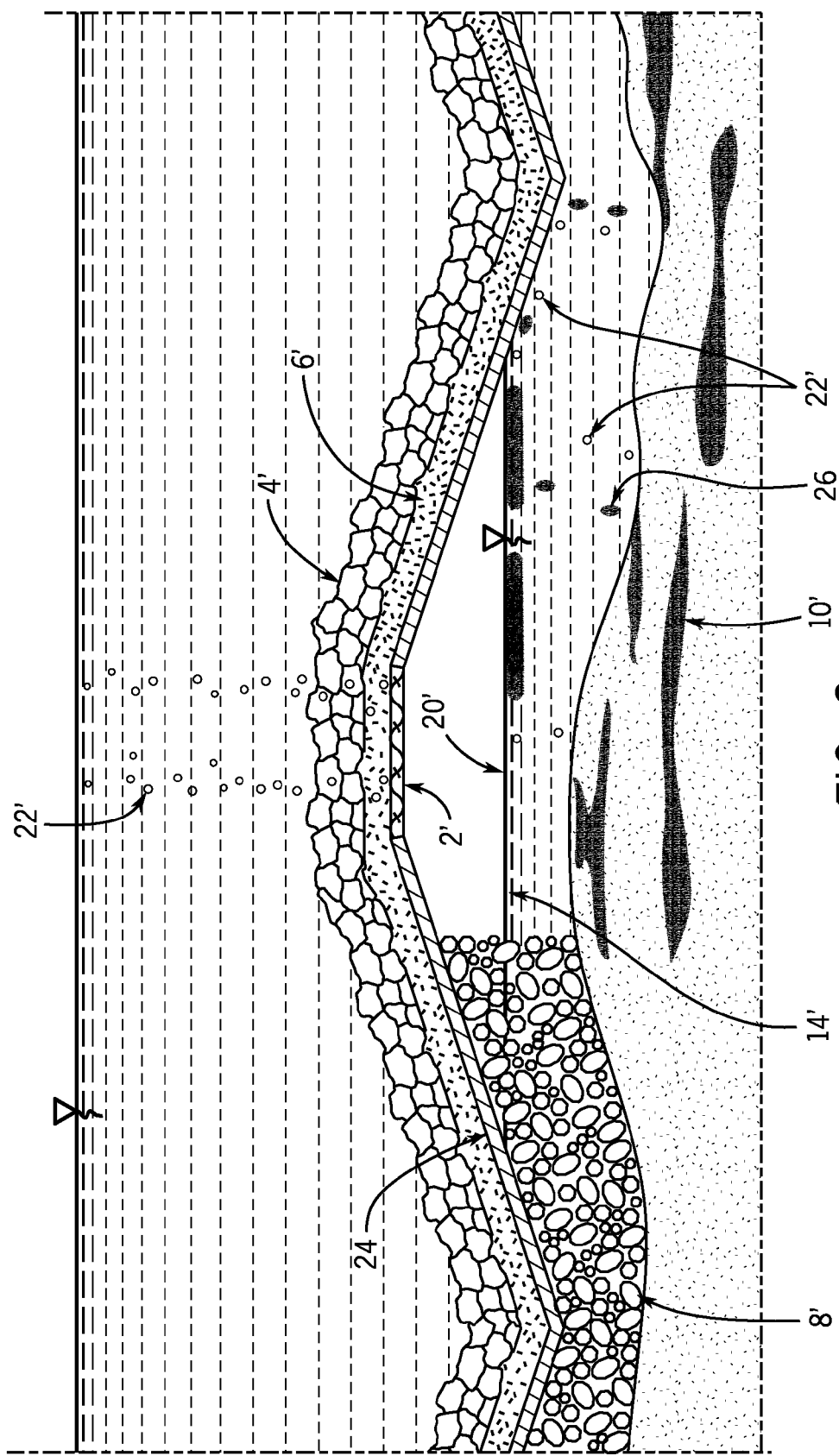
FIG. 2 is a side sectional view of an internal trapping, internally venting cap design suited for installation at contamination sites that comprise subsurface contours such as hummocks.

The embodiment shown in FIG. 2 (wherein features comparable to those of FIG. 1 are identified similarly) is more applicable to contaminated sites wherein the contour of the subsurface sediment is not flat, but instead is hummocky. Although the device is close in concept to that of FIG. 1, construction of the device of FIG. 2 warrants greater attention to site geometry and to materials than the embodiment shown in FIG. 1 to ensure an appropriate balance between performance (e.g. the extent and depth of the gas bubble beneath the vent relative to the height of the subsurface sediment) and the cost of materials needed to build the device. The device of FIG. 2 maintains the internal vent defined by the barrier layer 2', the armoring layer 4', bedding layer 6', accumulation layer 8', and the subsurface gas layer and water table 20 defined in the accumulation layer by the pore entry pressure of the barrier layer material. As in the embodiment of FIG. 1, the bedding layer 6' and armoring layer 4' can be considered optional components of the device that can be included when desired for purposes convenient device construction and added device stability. The FIG. 2 embodiment further includes an impermeable containment layer 24, sloped to a barrier layer material that functions as a vent, as described above. Because in this embodiment the vent defined by barrier layer 2' does not extend substantially across the full extent of the device, the impermeable containment layer 24 retains buoyant material 26 in the accumulation layer 8' while directing buoyant gases 22' toward the large gas bubble beneath the vent. The vent 2' can be substantially smaller in the device of FIG. 2, as it generally is provided only over the highest points of the sediment structures, thereby conserving on material costs while retaining the venting function. Advantageously, the sloped structure of FIG. 2 precludes contact between the contaminants and the vent at the apex of the device. Although only a single device structure is depicted in FIG. 2, it will be understood that as suggested in FIG. 2, adjacent structures can be provided. These adjacent structures could include devices of the type shown in FIG. 1 or other known trapping cap structures.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements within the spirit and scope of the invention as set forth in the appended claims.

The invention claimed is:

1. A method for trapping a buoyant contaminant in a body of water having a surface and a subaqueous sediment that releases a buoyant gas, the contaminant migrating on a path from the sediment toward the surface, the method comprising the step of: interposing in the migration path a contaminant-trapping device comprising a barrier layer and a gas-permeable accumulation layer below the barrier layer, the barrier layer having a pore entry pressure sufficiently high that a gas layer of desired height accumulates and is maintained in the accumulation layer, the gas layer having a lower boundary that defines an interface with water beneath the gas layer, whereby the migrating contaminant is retained at the interface and the buoyant gas is vented through the barrier layer.

2. The method of claim 1, wherein the barrier layer comprises at least one of a geotextile, a fine-grained geologic material, and a combination thereof.

3. The method of claim 1, wherein the barrier layer is substantially horizontal.

4. The method of claim 1, wherein the accumulation layer comprises a granular material.

5. The method of claim 4, wherein the granular material is selected from the group consisting of sand and gravel.

6. The method of claim 1, wherein the accumulation layer comprises an amendment.

7. The method of claim 6, wherein the amendment is selected from the group consisting of carbon, coke, and organoclay.

8. The method of claim 1, wherein the device further comprises an armoring layer above the barrier layer.

9. The method of claim 1, wherein the device further comprises a bedding layer above the barrier layer.

10. The method of claim 9, wherein the device further comprises an armoring layer above the barrier layer and wherein the bedding layer is between the armoring layer and the barrier layer.

11. A method for trapping a contaminant in a body of water having a surface and a subaqueous sediment that releases a buoyant gas, the contaminant migrating on a path from the sediment toward the surface, the method comprising the step of: interposing in the migration path a device comprising a barrier layer, a gas-permeable accumulation layer below the barrier layer, and an impermeable layer sloping toward the barrier layer, the barrier layer having a pore entry pressure sufficiently high that a gas layer of desired height accumulates in the accumulation layer, the gas layer having a lower boundary that defines an interface with water beneath the gas layer, the impermeable layer directing buoyant gas to the gas layer and the migrating contaminant to the interface in the accumulation layer, whereby the migrating contaminant is retained at the interface and the buoyant gas is vented through the barrier layer.

12. The method of claim 11, wherein the barrier layer comprises at least one of a geotextile, a fine-grained geologic material, and a combination thereof.

13. The method of claim 11, wherein the barrier layer is substantially horizontal.

14. The method of claim 11, wherein the accumulation layer comprises a granular material.

15. The method of claim 14, wherein the granular material is selected from the group consisting of sand and gravel.

16. The method of claim 11, wherein the accumulation layer comprises an amendment.

17. The method of claim 16, wherein the amendment is selected from the group consisting of carbon, coke, and organoclay.

18. The method of claim 11, wherein the device further comprises an armoring layer above the barrier layer.

19. The method of claim 11, wherein the device further comprises a bedding layer above the barrier layer.

20. The method of claim 19, wherein the device further comprises an armoring layer above the barrier layer and wherein the bedding layer is between the armoring layer and the barrier layer.

21. A device for trapping a buoyant migrating contaminant from a subaqueous sediment in a body of water, the sediment releasing buoyant gas, the device comprising a barrier layer and a gas-permeable accumulation layer below the barrier layer, the barrier layer having a pore entry pressure sufficiently high to accumulate and maintain, in use, a gas layer of desired height between the barrier layer and water in the accumulation layer.

22. The device of claim 21, wherein the barrier layer comprises at least one of a geotextile, a fine-grained geologic material, and a combination thereof.

23. The device of claim 21, wherein the barrier layer is substantially horizontal.

24. The device of claim 21, wherein the accumulation layer comprises a granular material.

25. The device of claim 24, wherein the granular material is selected from the group consisting of sand and gravel.

26. The device of claim 21, wherein the accumulation layer comprises an amendment.

27. The device of claim 26, wherein the amendment is selected from the group consisting of carbon, coke, and organoclay.

28. The device of claim 21, wherein the device further comprises an armoring layer above the barrier layer.

29. The device of claim 21, wherein the device further comprises a bedding layer above the barrier layer.

30. The device of claim 29, wherein the device further comprises an armoring layer above the barrier layer and wherein the bedding layer is between the armoring layer and the barrier layer.

31. A device for trapping a migrating contaminant from a subaqueous sediment in a body of water, the sediment releasing buoyant gas, the device comprising a barrier layer, a gas-permeable accumulation layer below the barrier layer, and an impermeable layer sloping toward the barrier layer, the barrier layer having a pore entry pressure sufficiently high to accumulate, in use, a gas layer of desired height between the barrier layer and water in the accumulation layer, the impermeable layer directing buoyant gas to the gas layer and the migrating contaminant to an interface defined between the gas layer and the water in the accumulation layer.

32. The device of claim 31, wherein the barrier layer comprises at least one of a geotextile, a fine-grained geologic material, and a combination thereof.

33. The device of claim 31, wherein the barrier layer is substantially horizontal.

34. The device of claim 31, wherein the accumulation layer comprises a granular material.

35. The device of claim 34, wherein the granular material is selected from the group consisting of sand and gravel.

36. The device of claim 31, wherein the accumulation layer comprises an amendment.

37. The device of claim 36, wherein the amendment is selected from the group consisting of carbon, coke, and organoclay.

38. The device of claim 31, wherein the device further comprises an armoring layer above the barrier layer.

39. The device of claim 31, wherein the device further comprises a bedding layer above the barrier layer.

40. The device of claim 39, wherein the device further comprises an armoring layer above the barrier layer and wherein the bedding layer is between the armoring layer and the barrier layer.

\* \* \* \* \*